Jan. 24, 1967  H. R. SUNDAY  3,299,782
RACK DRIVE FLUID ENGINE
Filed Jan. 21, 1965  6 Sheets-Sheet 1

INVENTOR.
HOWARD R. SUNDAY
BY
Van Valkenburgh & Lowe
ATTORNEYS

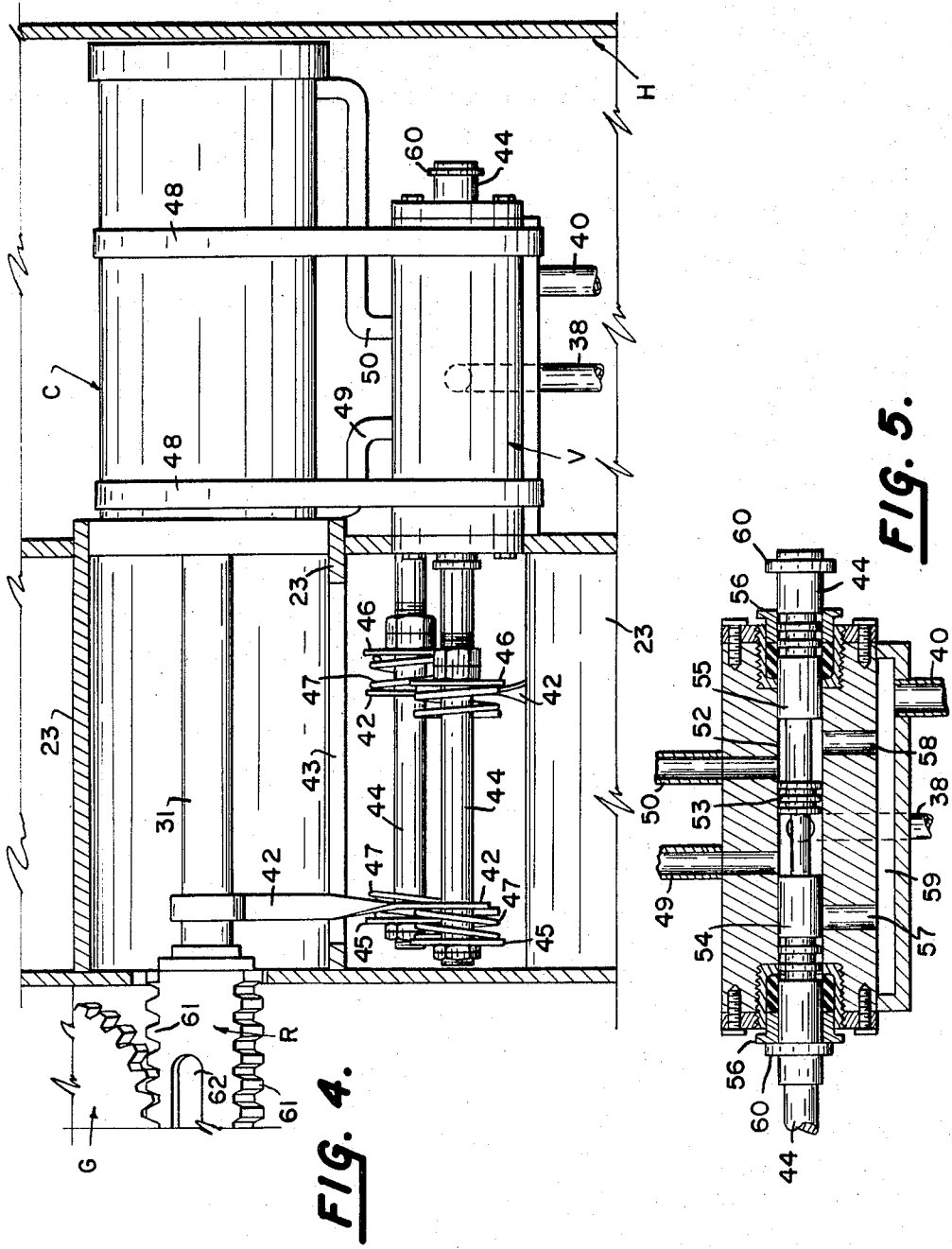

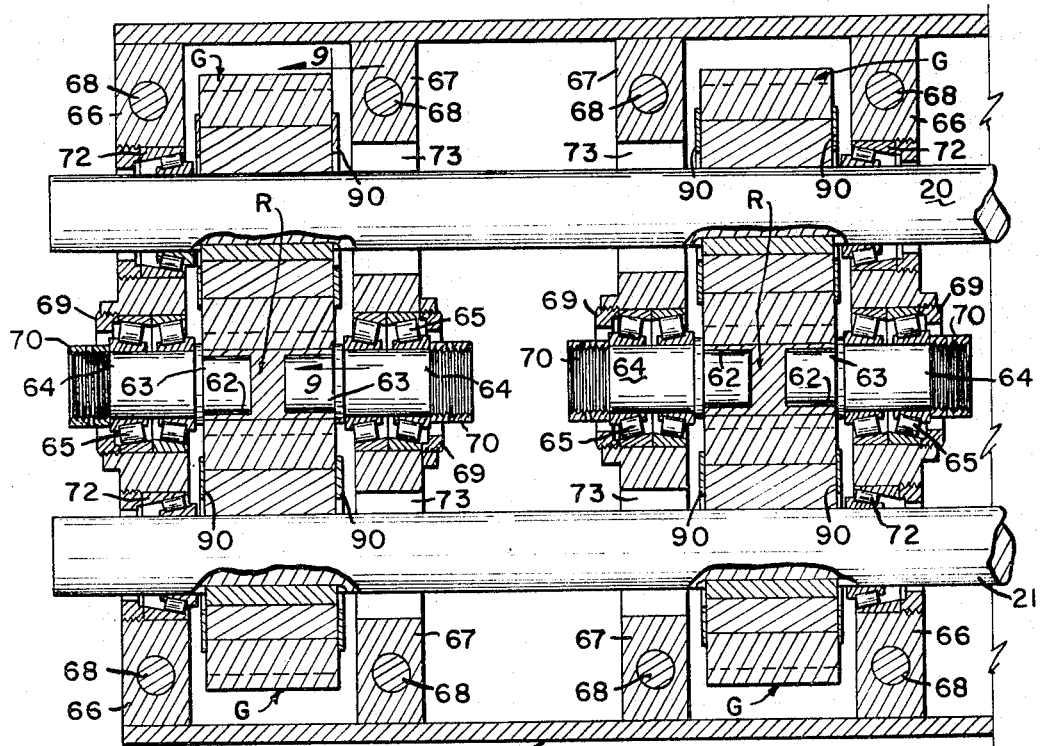
FIG. 6.
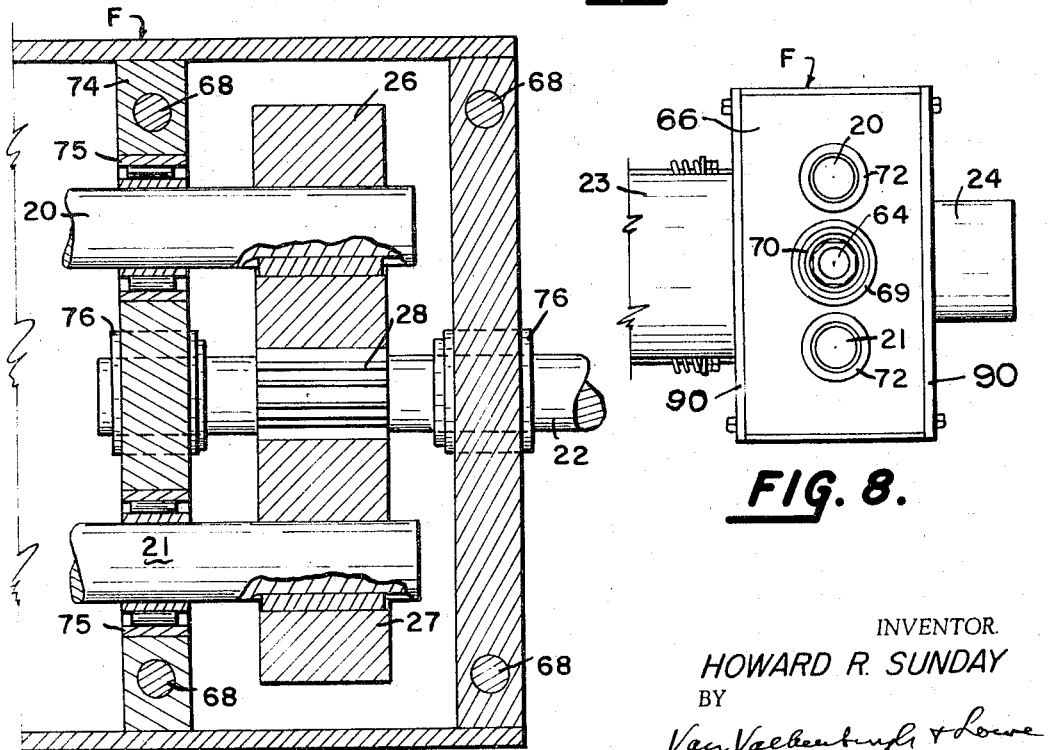
FIG. 7.
FIG. 8.
INVENTOR.
HOWARD R. SUNDAY
BY
Van Valkenburgh & Lowe
ATTORNEYS

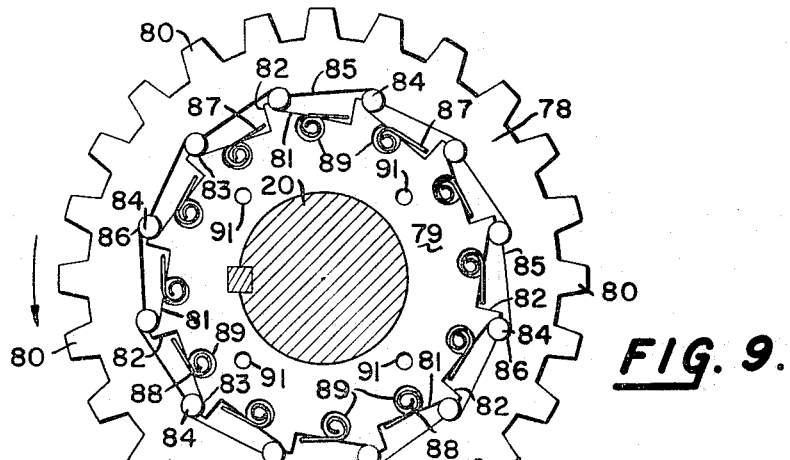
FIG. 9.
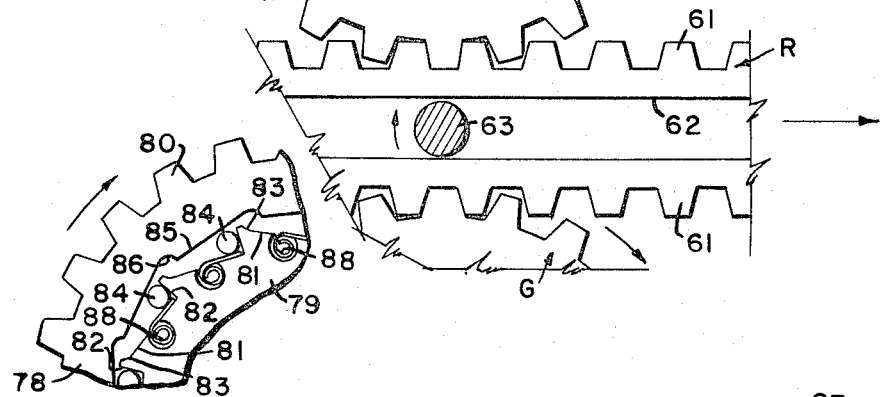
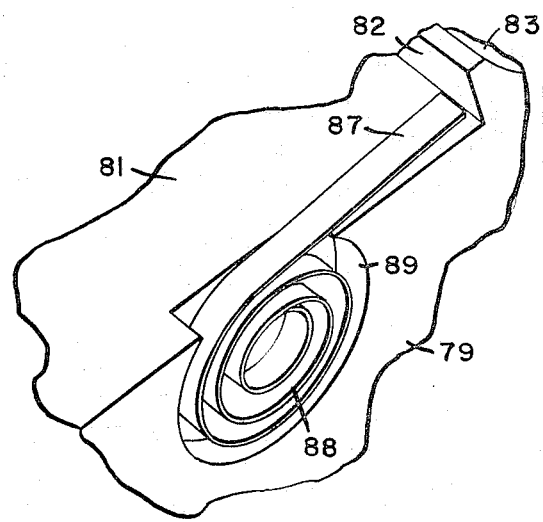
FIG. 10.
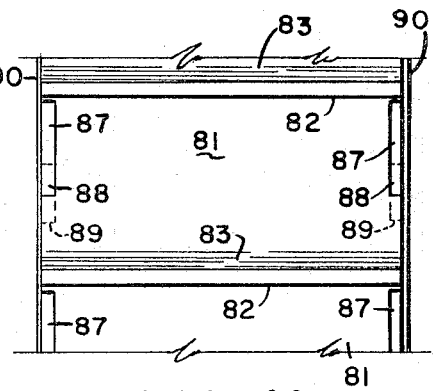
FIG. 11.
FIG. 12.
INVENTOR.
HOWARD R. SUNDAY
BY
Van Valkenburgh & Lowe
ATTORNEYS

United States Patent Office 3,299,782
Patented Jan. 24, 1967

3,299,782
RACK DRIVE FLUID ENGINE
Howard R. Sunday, P.O. Box 7, Eads, Colo. 81036
Filed Jan. 21, 1965, Ser. No. 427,036
7 Claims. (Cl. 91—189)

This invention relates to fluid engines and to the drive mechanisms of fluid engines which convert the reciprocative piston movement to rotation at an output drive shaft, and more particularly to fluid engines which use rack and pinion type driver mechanisms. However, the invention will be described herein with reference to a rack drive steam engine.

The basic arrangement of a rack drive steam engine includes a rack as an extension of the piston rod, as the driver, and a gear mounted upon a shaft and meshing with the rack to rotate responsive to reciprocation of the driver rack. Rotation of the gear is necessarily cyclic and in both clockwise and counterclockwise directions, as the rack moves back and forth; thus, the gear or the drive shaft must include a ratchet, whereby the output drive shaft will be rotated when the rack is moving in one direction, i.e., on one stroke of the engine, but will be disconnected from the mechanism to turn freely when the rack is moving in the reverse direction, i.e. on the return stroke of the engine.

Such a conventional arrangement is necessarily limited in its performance. In the first place, either a heavy flywheel or a number of cylinders, each carrying a rack to drive a gear, are required if the engine is to run smoothly. Furthermore, such an arrangement does not take advantage of the natural ability of the steam cylinder to provide a power stroke with the piston moving in either direction. With such disadvantages, the known types of rack-driver mechanisms for steam engines are no better than the more common flywheel-crank mechanisms, although it would appear that the rack-type driver mechanism would make for a more compact, lighter unit having a number of advantages over the more common types of steam engines.

The present invention was conceived and developed with the above considerations in view, and the invention comprises, in essence, a single or multiple cylinder fluid engine having a double acting rack mechanism associated with each cylinder, with the gears of each rack mechanism being carried upon shafts which, in turn, are geared to an output shaft.

It follows that an object of the present invention is to provide, by such arrangement, a fluid engine of compact construction capable of a maximum possible power output for its weight.

Another object of the invention is to provide a novel and improved rack drive fluid engine which advantageously uses both strokes of the piston as power strokes, to continuously apply driving torque to the output shaft of the engine.

Another object of the invention is to provide a novel and improved multiple cylinder rack drive fluid engine which may advantageously time the piston movements of the cylinders so as to apply a substantially constant driving torque on the output shaft without the need of flywheels or like heavy members.

Another object of the invention is to provide a novel and improved rack drive mechanism for a fluid engine which advantageously converts the reciprocative thrusting and pulling movements of the pistons to rotation at a drive shaft with an equalized continuous torque output throughout.

Another object of the invention is to provide a rack drive mechanism for a fluid engine which is especially adapted to operate in a smooth, quiet and trouble-free manner, both during high speed operation and during low-speed, high-torque operation.

Further objects of the invention are to provide, in a rack drive fluid engine, an efficient, low cost, rugged and durable unit which is adapted to be used in many different types of installations.

With the foregoing and other objects in view, the present invention comprises certain constructions, combinations and arrangements of parts and elements as hereinafter described, defined in the appended claims and illustrated, in preferred embodiment, in the accompanying drawings, in which:

FIG. 4 is a longitudinal, auxiliary sectional view of the cylinder and a fragment of the rack driver, as taken from the indicated line 4—4 of FIG. 2;

FIG. 5 is a longitudinal, sectional view of a control valve illustrated in FIG. 4, which operates the cylinder associated therewith;

FIG. 6 is a central, transverse, sectional view through the gearing mechanism of the apparatus, as taken from the indicated lines 6—6 of FIG. 1 and FIG. 3, but on a further enlarged scale and with transversely disposed driving shaft extensions and wall portions at one end of the unit being broken away to conserve space;

FIG. 7 is a central, transverse, sectional view which is a continuation of the section shown in FIG. 6, illustrating the parts omitted therein and specifically a gearing arrangement to interconnect transversely disposed driver shafts with an output shaft;

FIG. 8 is a fragmentary end view of a gear frame of the apparatus, taken from the left end thereof, as appearing in FIG. 6, but on a reduced scale;

FIG. 9 is a fragmentary, sectional detail showing a portion of a driver rack and a ratchet gear, as taken from the indicated line 9—9 of FIG. 6, but on a further enlarged scale and with the elements within the ratchet gear being positioned as for a driving stroke;

FIG. 10 is a fragmentary portion of the showing in FIG. 9, but with elements within the gear being positioned as for a non-driving, free-wheeling stroke;

FIG. 11 is a fragmentary portion of the internal face of the ratchet gear of FIG. 9, but on an enlarged scale;

FIG. 12 is a fragmentary, isometric view of a portion of the showing of FIG. 11, but on a further enlarged scale;

Figure 1:
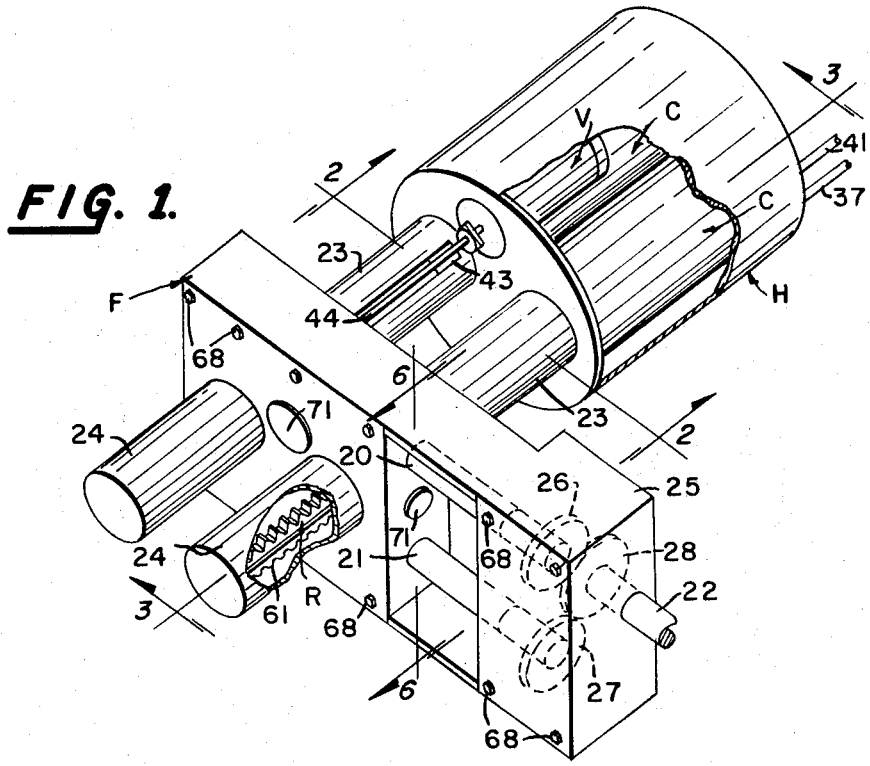
FIG. 1 is a diagrammatic, isometric view of a preferred arrangement of my improved steam engine with the operative cylinders and drivers being enclosed within suitable protective casings, with dotted lines indicating certain hidden gearing arrangements, and with broken away portions of the casings illustrating certain of the operative mechanisms otherwise hidden from view.

Referring more particularly to the drawings, FIG. 1 illustrates a basic arrangement of the components forming the steam engine, the primary components being a pair of cylinders C carrying steam actuated pistons and the gearing system which converts the reciprocatory movement of the pistons to rotation. The cylinders C are arranged side by side in spaced parallelism, and their axes will be hereinafter referred to as being longitudinally disposed. The piston of each cylinder C carries a driving rack R as a longitudinal extension of the piston rod thereof, and this rack R extends into and through the gearing system. The gears thereof are mounted upon a pair of transversely disposed driver shafts 20 and 21, the shafts being in mutual spaced parallelism and above and below the racks R extending from the cylinders. The pinion gears on the shafts 20 and 21 are ratchet gears which mesh with the racks R, as will be hereinafter described. To complete the basic arrangement, the shafts 20 and 21 extend transversely and to a common gearing connection with a transversely disposed output shaft 22.

As shown in FIG. 1, this steam engine is preferably housed and supported in suitable housings and framework members which effectively enclose the components thereof. The cylinders, steam lines and the steam engine control valves are preferably mounted in a common housing H which is illustrated as a cylindrical shell, although it may be of any suitable form. This housing H not only encloses and supports the cylinders, lines and valves, but also it should be insulated, to increase the thermal efficiency of the unit. Each piston rod and drive rack R extending from the cylinders is suitably housed in an elongated cylindrical shell 23, which extends from one end of the housing H to a frame housing F for the gearing, and an extension shell 24 having a length sufficient to encase each rack when at its fullest extended position. The gearing and shafts 20 and 21 are housed in the boxlike frame F which intercepts shells 23 and 24 and is provided with an offset 25 at the end containing output shaft 22, to accommodate gears 26 and 27 mounted on respective shafts 20 and 21, which mesh with a gear 28 mounted on output shaft 22.

The steam engine cylinders C and the controls for these cylinders are conventional. Each cylinder C, as in FIG. 3, includes a cylindrical tube 29 within which is disposed a piston 30, having an X shape in cross section, while a piston rod 31 is attached to piston 30 and extends through one end of the cylinder. The opposite end of the cylinder is closed by a cap 32 attached to the end of tube 29 and clamping in position a spacer 33 which conforms generally in shape to the corresponding end of piston 30, to reduce the clearance and provide a cushion of steam at the end of the stroke. Similarly, the end from which the piston rod extends is closed by a similar but annular spacer 34 and cap 35, with a central guide tube 36, through which the piston rod 31 moves, mounted between them. The piston 30 and the guide tube 36 include conventional rings and packers which prevent leakage of steam during operation of the engine. A pressure steam line 37 originates at a boiler or like source (not shown), to extend into the housing H, where it bifurcates, with each branch 38 having a shut-off valve 39 interposed therein, and extending to the intake of a four-way control valve V. Each control valve V is also connected with a branch discharge line 40, with the two branch lines connecting together, to extend as a common line 41 from the apparatus for discharge into the air or into a condenser.

Figure 2:
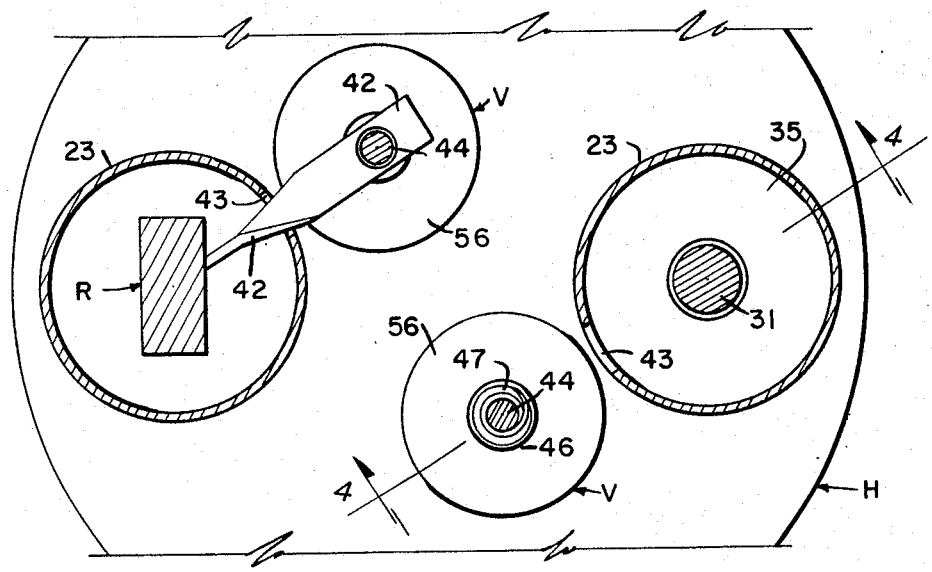
FIG. 2 is a transverse, elevational and sectional view, as taken from the indicated line 2—2 of FIG. 1, but on an enlarged scale and with portions of the housing for the cylinders being broken away to conserve space.

Each piston rod 31 is sufficiently long to permit a full stroke of the piston within its cylinder, and each piston rod 31 carries an arm 42 adjacent its extended end, which arm has a 90° twist therein and moves a valve control means at the end of each stroke to shift the valve V and reverse the steam flow through the valve, thereby to reverse the movement of the piston. The arm 42 outstands laterally from piston rod 31, as in FIG. 2, to extend through a slot 43 in the shell 23. The four-way control valve V is a sliding spool type, as described later, with the spools integral with or connected to a rod 44 aligned in spaced parallelism with the piston rod 31 to extend alongside slot 43 through the reach of the movement of rod 31. Flanges 45 and 46, each holding a spring 47, are mounted at opposite ends of each rod 44, as in FIGS. 3 and 4, and in operative movement of the piston, at either end of the stroke, the arm 42 moves against a spring 47 to first compress the spring against its flange 45 or 46, and then to shift the rod 44 and control valve V with the spring creating an excess of movement, as the shifting movement of the valve V commences.

Each control valve V, which may be attached to the corresponding cylinder C by brackets 48, as in FIG. 4, or may be attached to the side of the corresponding cylinder by straps around the cylinder and valve, is connected to the opposite ends of the cylinder by pipes 49 and 50. As in FIG. 5, each control valve V is a four-way valve and includes a longitudinal passageway 52 wherethrough extends the rod 44, as in FIG. 5, on which is mounted a central spool 53 and axially spaced spools 54 and 55, which also may be machined from rod 44. The spools may be provided with conventional piston rings, while a suitable packing gland 56 is provided at each end thereof to prevent leakage of steam from the valve. The pressure line 38 is at the operative center of this valve and there communicates with the central passageway 52. Lateral passageways, as shown, are symmetrically spaced from the center to connect passageway 52 with the respective lines 49 and 50 leading to the opposite ends of the respective cylinder C. At further symmetrical spacing, lateral exhaust passageways 57 and 58 connect passageway 52 with a manifold 59 which, in turn, connects with the discharge line 40. Between central spool 53 and each of spools 54 and 55, a reduced diameter chamber is formed. This spool valve is operative at only two positions and is shifted from one position to the other by the arm 42. When operative at one position, the central spool 53 is shifted, as illustrated in FIG. 5, so that pipe 49 is connected to the pressure line 38, and pipe 50 is connected through passageway 58 and manifold 59 with exhaust pipe 40, i.e. the valve V has just been shifted to cause piston 30 to reverse and move toward the right in FIG. 3. When the spool valve rod 44 shifts in the opposite direction, the pipe 49 is connected through passageway 57 to exhaust manifold 59 and exhaust pipe 40, while the pressure line 38 is connected with the pipe 50. Stops 60 are mounted on the spool rod on portions extending beyond each end of the valve, to properly limit these shifting movements.

As the pistons 30 reciprocate responsive to the shifting of the spool valves above described, they drive the rack members R back and forth. It is to be noted that each cylinder may operate independently of the other and in any selected manner or sequence. However, a preferred sequence of operation is to time the movements of the piston of one cylinder to follow the other at an approximate half-cycle interval, as in the manner indicated in FIG. 13. With this arrangement, one piston will be at an approximate half-way position when the other piston is at an end of its stroke. Thus, the first piston 30 will be at the position of maximum thrust when the second piston 30 is momentarily stopped and unable to perform work or produce a thrust until it commences to move in the opposite direction. The actual operation of the two pistons of cylinders C may be easily controlled by valves 39 in the respective branch pressure lines 38. Also, movements of one piston may be coordinated with movements of the other by positively acting mechanisms, as will be hereinafter explained.

Conversion of the reciprocatory movement of each piston 30 to rotation is effected by the movement of racks R, each between a pair of ratchet-type gears G, one gear being mounted upon the shaft 20 above the rack and the other being mounted on the shaft 21 below the rack. Both gears G are of the same size, with the rack R for each piston 30 being of the same size as the rack of the other and attached to the end of piston rod 31 by a connector 60, as in FIG. 3. Each rack R includes teeth 61 along its upper and lower edges, which simultaneously engage with upper and lower gears G but drive only one gear G at a time. The length of each rack is somewhat in excess of the length of the stroke of the piston to which it is connected, to assure full contact with the gears G throughout its range of movement.

Figure 3:
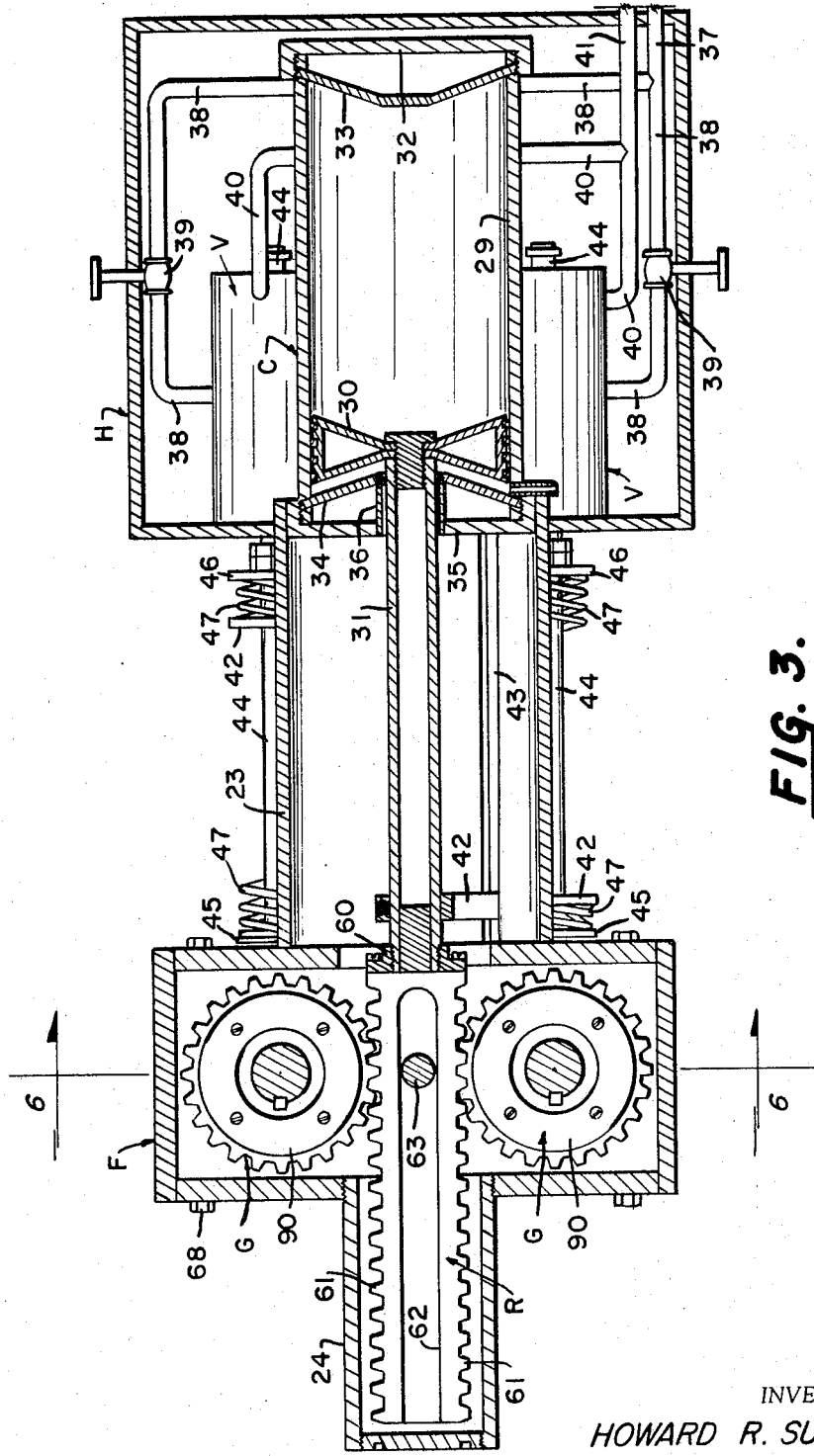
FIG. 3 is a longitudinal, sectional view of the apparatus, as taken from the indicated line 3—3 of FIG. 1, but on an enlarged scale and with piping extending beyond the housing being broken away to conserve space.

Each rack is rectangular in section, with a longitudinal slot 62 in each side thereof, as in FIGS. 3 and 6. The upper and lower surfaces of each side slot 62 form supporting shoulders for roller pins 63 which will support the rack against the radial thrust of a gear at one side of the rack, so that the rack does not bear against the other gear and overload the ratchet mechanism of that gear when it is free-wheeling, as will be further described. Each rack R is aligned with the axis of its cylinder, with the spacing of the shafts 20 and 21 being equally above and below the axes of the cylinders. Each rack is held in this axial alignment in a vertical direction, as well as in a horizontal direction, by the pair of opposing rollers 63 which fit into the side slots 62, as in FIG. 6. The rollers project from stub shafts 64 which are mounted in bearings 65, which, in turn, are mounted in plates 66 and 67 at opposite sides of each rack. These frame plates 66 and 67 are vertical, longitudinally disposed members normal to shafts 20 and 21. They are secured to transverse members of the frame F by suitable stay bolts 68, and the parts of frame F and plates 66 and 67 are all sufficiently heavy as to provide a rigid structural frame assembly which will not deflect a significant amount under load.

The bearings 65 which hold the stub shafts 64 are preferably of a rigid roller type, adapted to resist lateral loading, longitudinal torsion and axial thrust. This is necessary since the rollers 63 which cantilever from the supporting stub shafts engage the inner walls of the rack slots 62 and must resist both a loading created by the pressure of a gear G pressing the rack away from the opposite gear G and also any tendency of the rack to shift laterally. Accordingly, each bearing 65 is carried in a hole in its frame plate 66 or 67 with a tight fit, as produced by a lock nut 69 engaging a threaded extension of the outer bearing race at one side of the plate, as in FIGS. 6 and 8. Also, to permit precise axial adjustments of each stub shaft and roller thereon to align the racks laterally and to adjust for clearance, a threaded adjusting sleeve 70 is provided at the outer race of each bearing, which engages with a threaded portion of the stub shaft 64. Suitable access plates 71 may be provided in the wall of the frame F, as in FIG. 1, to facilitate reaching these adjusting members 69 and 70, although one set may be adjusted from one end of frame F, as in FIG. 8.

In operation, the racks will move back and forth exerting pressure against the roller carriers 63 from one side and then from the other side, as the loading is transmitted from one gear G to the other, as will be explained. In such movement of the rack in one direction, a roller 63 will be bearing against one side of the slot 62 and rotate against that side, and with movement in the opposite direction, the roller will bear against the other side. Accordingly, it is contemplated that the diameter of each roller 63 be slightly less than the width of the slot 62 to provide a free rolling action, as in the manner illustrated in FIG. 9, the difference in the diameter of the roller and the slot width in that figure being exaggerated for purposes of illustration.

Each plate 66 also conveniently carries a roller thrust bearing 72 for each of shafts 20 and 21, while similar bearings may be carried by each plate 67, or shafts 20 and 21 merely extend through holes 73 therein. An additional bearing plate 74 may be mounted in frame F, as in FIG. 7, carrying bearings 75 for shafts 20 and 21, as well as a bearing 76 for output shaft 22, with another bearing 76 being mounted in the end of frame F, on the opposite side of gear 28. Each rack R may also operate a conventional pump (not shown) for supplying lubricant to cylinders C.

Each gear G is of a ratchet type consisting of an outer ring 78 and an inner ring 79, with the two rings being interconnected by a suitable ratchet mechanism which permits a free wheeling action, when rotation is in one direction, and a locking action, when rotation is in the opposite direction. The inner ring 79 of each gear G, secured to its shaft 20 or 21 as by a key, as shown, is the driven portion, which, in turn drives its shaft 20 or 21. The outer ring carries gear teeth 80 which mesh with the teeth 61 of the rack R. Accordingly, the outer ring, driven by movement of the rack, will drive the inner ring when rotating in the locking direction.

A preferred construction of ratchet mechanism is illustrated in FIGS. 9 and 10, where the gear G is adapted to lock when the outer ring 78 is being driven in a counterclockwise direction, as shown in FIG. 9, and to free wheel when the outer ring 78 is being driven in a clockwise direction, as in FIG. 10. The opposing surfaces between the two rings are divided into regular arrays of segments which oppose each other whenever the rings are interlocked. The segments of the inner ring 79 are formed as lands 81 which are inclined with respect to a common circle at the base of the lands, with the offsets from one inclined land to another forming shoulders 82 and providing a sawtooth appearance, when the unit is viewed as a whole. Each shoulder 82 extends outwardly from the adjacent land, and the surface adjacent each shoulder 82 is filleted to provide an arcuate roller seat segment 83, as more clearly seen in FIG. 10, for holding a locking roller 84, as in FIG. 9. The opposing segments of the outer ring 78 are also formed as lands 85 which are inclined in the opposite direction to that of the lands 81 of the inner ring 79. Each step between adjacent lands 85 is filleted to provide an arcuate roller seat segment 86 which lies in spaced opposition to any roller seat segment 83 of the inner ring 78, whenever the ratchet is locked. The rollers 84 are normally positioned to remain in each segment of the inner ring, and when the gear is rotating in a direction for locking the ratchet, as in FIG. 9, the rollers fit the inner and outer rings at the seats 83 and 86 and hold the rings together in true concentric relation. However, when the inner and outer rings of the gear are being rotated in the opposite, free wheeling direction, as in FIG. 10, the rollers 84 move away from the seats, and remain with the segments of the inner ring 79, being pushed into the troughs at the base of the lands 81 at the adjacent shoulder 82.

To provide for locking action the instant the ratchet gears reverse from a free wheeling direction to a locking direction, a resilient finger 87 is positioned at each side of each inner ring land, which extends from the approximate center of the land to the adjacent shoulder 82. The fingers 87 at each land are adapted to urge the rollers 84 outwardly from the trough portion, where they are lodged during free wheeling rotation of the gear, to a position where they will contact the opposing outer ring lands 85 and seats 86 to lock the instant a reverse movement occurs. Each finger 87 is an extension of a flat coiled spring 88. These springs are comparatively narrow and are positioned in small, generally annular sockets 89 in the sidewalls of the inner ring of each gear, as in the manner illustrated in FIGS. 11 and 12. To maintain rollers 84 from moving an undue amount in an endwise direction, as well as to hold the springs 88 in sockets 89, an annular plate 90, as in FIGS. 3, 6 and 11, is mounted on each side of each gear G, being attached thereto in any suitable manner, as by cap screws extending through the plates and into holes 91, shown in FIG. 9, it being understood that holes 91 are tapped to receive the cap screws.

It is to be noted that, through the gears G, the two shafts 20 and 21 are caused to be rotated in the same direction and at substantially the same rate of rotation, while the output shaft 22 rotates in the opposite direction. The direction of rotation of the shafts 20 and 21 is established by the manner in which the ratchets of the gears G are oriented, and all of the ratchets are arranged to lock in the same direction of rotation. The rotation of each gear G must be according to the reciprocation of its rack R, and when the rack is moving in one direction, one gear G is locked and the other is free wheeling. When the direction of rack movement changes, the first is then free wheeling and the other is locked. In this manner, the piston of each cylinder C is able to deliver powered driving strokes in both directions, first to rotate shaft 20 and then to rotate shaft 21. With both pistons operating together, but out of phase, a substantially constant delivery of power to the shafts 20 and 21 and thence to the output shaft 22 is effected.

Figure 13:
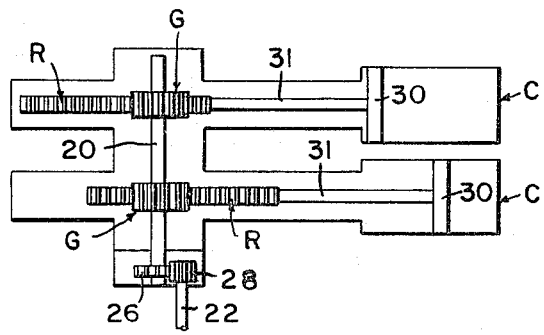
FIG. 13 is a diagrammatic, sectional plan view of the apparatus, illustrating desirable comparative piston movements within the cylinders and a desirable timing arrangement to permit a continuous operative driving torque on the output shaft of the apparatus, especially when one of the pistons has reached the end of its stroke and is momentarily stopped prior to commencing a reverse movement.
Figure 14:
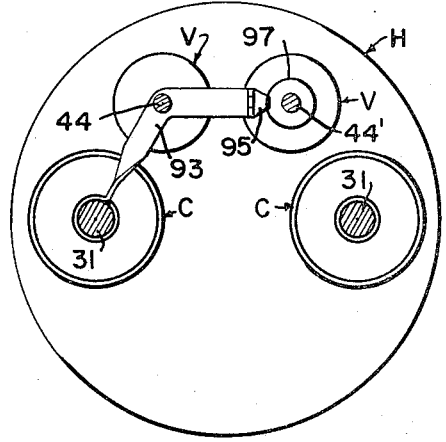
FIG. 14 is a fragmentary, transverse, sectional view, similar to FIG. 2, but showing an alternate arrangement of the components thereof.
Figure 15:
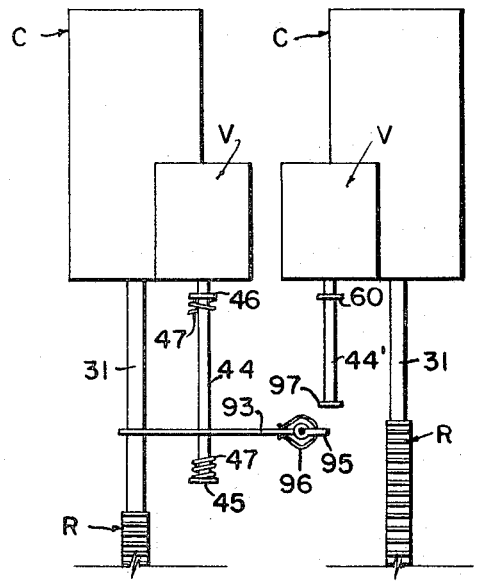
FIG. 15 is a fragmentary, diagrammatic plan view of cylinder control members according to the alternate arrangement of components illustrated in FIG. 14.
Figure 16:
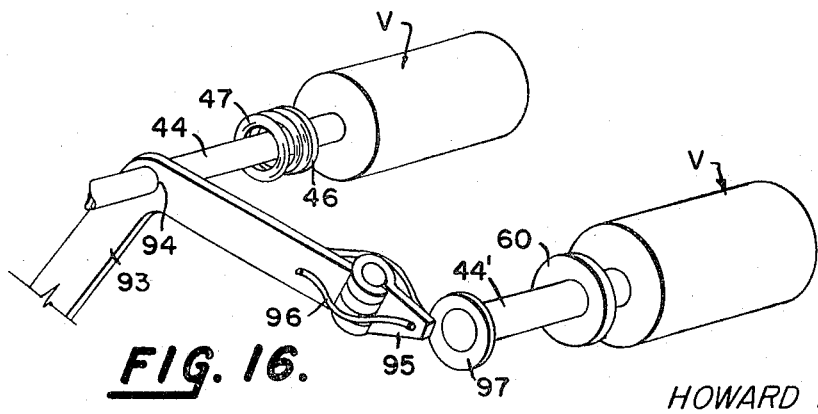
FIG. 16 is a fragmentary, perspective view of a portion of the controls of the alternate arrangement of FIG. 14.

An alternative arrangement of piston controls is illustrated in FIGS. 14, 15 and 16, to effect a positive mechanical cycling of the two cylinder pistons so that one is a half-cycle out of phase with the other, as in the manner illustrated in FIG. 13. In this arrangement, only one piston rod 31 is provided with an angular arm 93 and the two four-way control valves V are rearranged so that this arm 93 contacts the spring 47 of one valve rod 44 of the control valve for its piston, as hereinbefore described. The arm 93 is angular to extend from one valve control rod 44 to the opposite control rod 44', having a hole 94 therein through which rod 44 passes and having a pivoted finger 95 which controls a modified rod 44' of the other valve V. Finger 95 is normally held in a straight position by a double acting spring 96, so that it may snap past a flange 97 mounted on the end of rod 44', when moving in either direction. This modified rod 44' is of approximately half length, compared with the piston stroke, as illustrated in FIG. 15. Finger 95 is adapted to engage the flange 97, as the piston rod 31 carrying the arm 93 moves to its halfway position. Through double acting spring 96, which permits the finger to swing responsive to the excess of pressure, whenever the finger moves against the flange 97, it first shifts the rod 44' in the direction of its movement. Then, it deflects to move past the flange as the piston carrying arm 93 continues its stroke. The shifting of the rod 44', however, changes the direction of the stroke of the other piston which is associated with the control rod 44'. In this manner, the piston controlled by rod 44' changes its direction of stroke, whenever the piston carrying arm 93 is at the half-way position of each stroke. As before, stops 60 (see FIG. 5) on the rod 44' at opposite ends of the valve, will limit the stroke of the valve rod 44'.

Although this invention has been described with reference to a rack drive steam engine, it will be understood that other types of fluids, such as air, gas and other fluids, may be utilized to supply the motive power for driving the engine. Of course, when a fluid other than steam is used to provide such motive power, appropriate changes of a conventional nature may be desirable to accommodate a fluid other than steam.

While I have described my invention in considerable detail, it will be obvious that others skilled in the art can build and devise alternate and equivalent constructions, which are nevertheless within the spirit and scope of my invention. Hence, I desire that my protection be limited, not by the constructions illustrated and described, but only by the proper scope of the appended claims.

What is claimed is:

1. A fluid engine comprising:
 a cylinder having a piston reciprocatively carried therewithin and a piston rod extending from one end of the cylinder;
 a double-gear rack attached to the piston to form a longitudinal extension thereof and having opposed longitudinal slots on opposite sides;
 a pair of spaced, parallel drive shafts straddling, and lying transversely of, the gear rack, and at opposing positions within the reciprocative reach of the rack movements;
 a gear mounted upon each drive shaft meshing with one of the said gear racks and being adapted to rotate clockwise and counterclockwise responsive to reciprocative movements of the rack;
 a framework on which said gears are mounted;
 a roller mounted upon said framework on each side of said rack between said gears extending into the respective longitudinal slot, with the edge of the respective roller engaging a side of the corresponding slot to hold the rack in position; and
 ratchet means associated with each gear and shaft adapted to lock the gear with the shaft with the gear rotation in one direction and to free the gear from the shaft with the gear rotation in the opposite direction, whereby the clockwise and counterclockwise movements of the gear rotates the shaft in a selected direction and said shaft is adapted to rotate continously in said direction.

2. In the fluid engine defined in claim 1, including an output shaft rotatably connected with said two drive shafts and being adapted to be rotated by rotation of both shafts, whereby driving power of the piston is applied to the output shaft, through the rack, the gears and the drive shafts, with the piston moving in either direction.

3. The organization set forth in claim 1, wherein said rollers have a diameter slightly less than the width of said slots, whereby to permit the rack to be pushed against the roller responsive to the driving action of one of the gears to rotate freely therein and to be pushed against the opposite side of the roller responsive to the driving action of the opposite gear.

4. A fluid engine comprising:
 a cylinder having a piston reciprocatively carried therewithin and a piston rod extending from one end of the cylinder;
 a double-gear rack attached to the piston rod to form a longitudinal extension thereof;
 a pair of spaced, parallel drive shafts straddling, and lying transversely of, the gear rack, and at opposing positions within the reciprocative reach of the rack movements;
 a gear mounted upon each drive shaft meshing with one of the said gear racks and being adapted to rotate clockwise and counterclockwise responsive to reciprocative movements of the rack;
 ratchet means associated with each gear and shaft adapted to lock the gear with the shaft with the gear rotation in one direction and to free the gear from the shaft with the gear rotation in the opposite direction, whereby the clockwise and counterclockwise movements of the gear rotates the shaft in a selected direction and said shaft is adapted to rotate continuously in said direction, said ratchet means including opposed tapered lands of inner and outer portions of each gear and rollers for selectively engaging said lands; and
 spring means associated with said inner portions of said gears for edging said rollers against said outer lands.

5. A fluid engine, as defined in claim 4, wherein:
 each said spring means is formed as an involute carried in a socket at one side of a land of said inner gear portion, with an extension of said spring extending along the surface of the land.

6. A fluid engine comprising a pair of cylinders mounted in spaced parallelism, having pistons reciprocatively carried within them, with each piston including a rod extending from one end of the cylinder, said piston rods defining reciprocative movements along parallel axes;
 a double gear rack attached to each piston rod to form a longitudinal extension thereof, said rack including gear teeth at opposing faces and longitudinal side slots between the gear teeth;

a pair of spaced parallel drive shafts straddling, and lying transversely of, the two racks within the reciprocative reach of the rack movements;

a pair of gears mounted upon each drive shaft with each gear meshing with one of said racks and being adapted to rotate clockwise and counterclockwise responsive to reciprocative movements of the rack and with the opposing gears on the other side of the shaft being adapted to rotate oppositely to the first mentioned gears;

a ratchet means associated with each gear adapted to lock the gear to its shaft when the gear is rotating in one direction and to free the gear from its shaft when it is rotating in the opposite direction, with all ratchet means being adapted to rotate the gears, when driving, in the same selected direction, whereby movement of the gears in one direction will rotate their shafts and movement of the gears in the opposite direction will be free, and with the gears at one side of the rack being adapted to drive a shaft with the rack moving in one direction, and the gears at the other side of the rack being adapted to drive their shafts with the rack moving in the opposite direction;

an output shaft interconnected with both drive shafts and being adapted to rotate continuously in a selected direction with rotation of the drive shaft; and a valving means for each cylinder adapted to control the reciprocative movements of each piston within the cylinder and to operate the pistons out of phase, with one piston being substantially at the middle of a stroke when the other piston is at its end of a stroke, whereby to permit a continuous driving torque to be applied to the drive shafts by either one or both of the pistons.

7. A fluid engine, as defined in claim 6, wherein:

the valving means on each cylinder adapted to control the respective piston movements includes longitudinal, shiftable actuator rods, the actuator rod of a first valving means being shifted to reverse the piston movement of its cylinder as its piston approaches the end of a stroke, and the second valving means being shifted to reverse the movement of the piston of its cylinder when the piston of the first said cylinder is at the approximate middle of its stroke.

References Cited by the Examiner

UNITED STATES PATENTS

| | | | |
|---|---|---|---|
| 173,978 | 2/1876 | Lysager | 192—45 |
| 488,821 | 12/1892 | Kipp | 192—45 |
| 549,118 | 11/1895 | Faukner | 92—136 |
| 770,504 | 9/1904 | Mitterreiter | 308—6 |
| 950,866 | 3/1910 | Poulson | 92—136 |
| 997,500 | 7/1911 | Holmen | 92—136 |
| 1,271,569 | 7/1918 | Hancock | 92—136 |
| 1,690,646 | 11/1928 | Meyer | 92—136 |
| 1,923,853 | 8/1933 | Van Duyn | 308—6 |
| 1,949,702 | 3/1934 | Wennerstrom | 192—45 |
| 3,103,998 | 9/1963 | Watson | 192—45 |

MARTIN P. SCHWADRON, *Primary Examiner.*

PAUL E. MASLOUSKY, *Assistant Examiner.*